Sept. 18, 1962  F. SKAY  3,054,871
PRESSURE ACTUATED SWITCH
Filed Dec. 16, 1958  3 Sheets-Sheet 1

F. SKAY
INVENTOR.

BY E. C. McRae
G. H. Oster
K. L. Zeraschling
ATTORNEYS

Sept. 18, 1962   F. SKAY   3,054,871
PRESSURE ACTUATED SWITCH
Filed Dec. 16, 1958   3 Sheets-Sheet 2

F. SKAY
INVENTOR.

BY *E. C. McRae*
*T. H. Oster*
*K. L. Zerschling*

ATTORNEYS

Sept. 18, 1962 F. SKAY 3,054,871
PRESSURE ACTUATED SWITCH
Filed Dec. 16, 1958 3 Sheets-Sheet 3

F. SKAY
INVENTOR.

BY E. C. McRae
F. H. Oster
K. L. Zerschling

ATTORNEYS

United States Patent Office 3,054,871
Patented Sept. 18, 1962

3,054,871
PRESSURE ACTUATED SWITCH
Frank Skay, Detroit, Mich., assignor to Ford Motor Company, Dearborn, Mich., a corporation of Delaware
Filed Dec. 16, 1958, Ser. No. 780,739
3 Claims. (Cl. 200—83)

This invention relates to a pressure actuated switch and more particularly to a pressure actuated switch which provides a wiping action between the terminals and a contact means which completes an electrical circuit including said terminals.

Although not so limited, the present invention is particularly applicable for use as a stop warning device in an automotive vehicle with the switch sensing the pressure of the hydraulic fluid in the brake system and completing a circuit to the stop lights when the pressure of the fluid reaches a selected value. According to the construction of the invention, there is provided a cup-like hollow casing having an extension thereon for connection to a source of fluid under pressure, for example, connection to the master brake cylinder of an automotive vehicle. A member, preferably of insulating material, is positioned within the hollow casing and clamps a flexible diaphragm against an end portion of the casing to seal the fluid from the member. The member is provided with a cavity opposite the diaphragm and has a pair of terminals extending therethrough. These terminals are provided with flexible end portions and an electrical circuit is closed between these terminals by means of a conductive contact member which is positioned against the flexible diaphragm and which is brought into contact with the flexible end portions of the terminals when the pressure on the diaphragm reaches a selected value. The flexible end portions of the terminals provide a wiping action with this contact member so that the voltage drop between the terminals and the contact means is maintained at a minimum value.

An object of the present invention is the provision of a rugged, dependable and inexpensive pressure actuated switch.

Another object of the invention is the provision of a rugged, dependable pressure actuated switch in which a wiping action occurs between the terminals thereof and a contact member which completes an electrical circuit across said terminals.

Other objects and attendant advantages of the present invention will become more apparent as the specification is considered in connection with the drawings in which.

Figure 1:
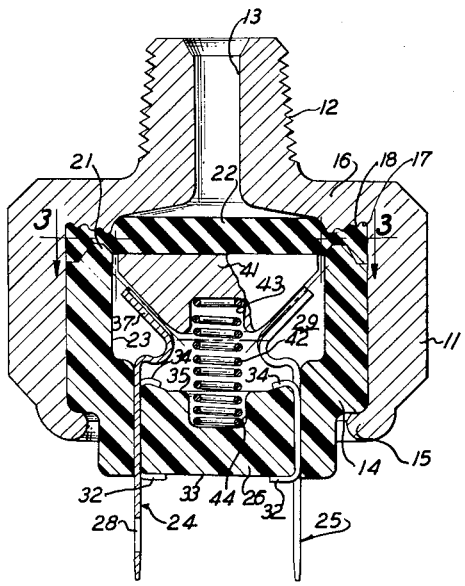
FIGURE 1 is a sectional view of one embodiment of the invention taken along the lines 1—1 of FIGURE 3 and showing the switch in an open position.
Figure 2:
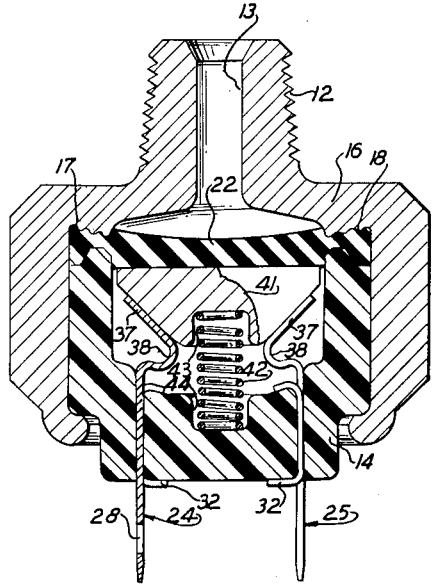
FIGURE 2 is a view similar to FIGURE 1 but showing the switch in a closed position.

Referring now to the drwings, there is shown in FIGURES 1 thru 6 one embodiment of the pressure actuated switch of the present invention. As can best be seen by reference to FIGURES 1 and 2, this embodiment includes a cup-shaped hollow casing 11 having a threaded extension 12 extending therefrom which may be conveniently threaded to a receptacle containing a fluid under pressure for actuating the switch, for example, the master cylinder of a brake system. This threaded extension has a passage or bore 13 extending therethrough. A stop member 14, preferably of insulating material such as molded phenolic resin, is positioned in the hollow casing 11 and is securely held therein by means of an inturned flange 15 on the casing which may conveniently be formed by crimping. The end wall 16 of the casing has a series of annular grooves 17 and ridges 18 and the stop member 14 has a ridge 21 positioned around the inner periphery thereof. A flexible diaphragm 22, preferably made of a synthetic rubber, is clamped between the end wall 16 of the casing and the stop member 14 with the ridges and grooves in the end wall and the ridge of the stop member securely holding this diaphragm in position.

Figure 6:
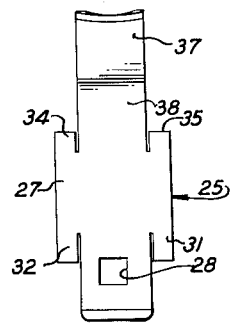
FIGURE 6 is a side elevational view of one of the terminal members shown in FIGURES 1 thru 4.
Figure 7:
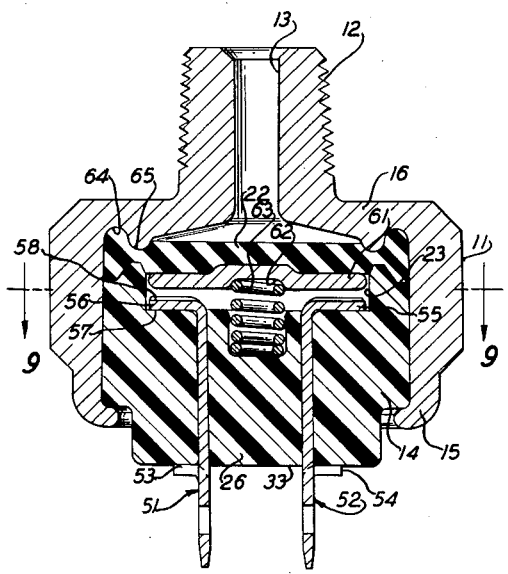
FIGURE 7 is a sectional view of another embodiment of the invention taken along the lines 7—7 of FIGURE 9 and showing the switch in an open position.
Figure 8:
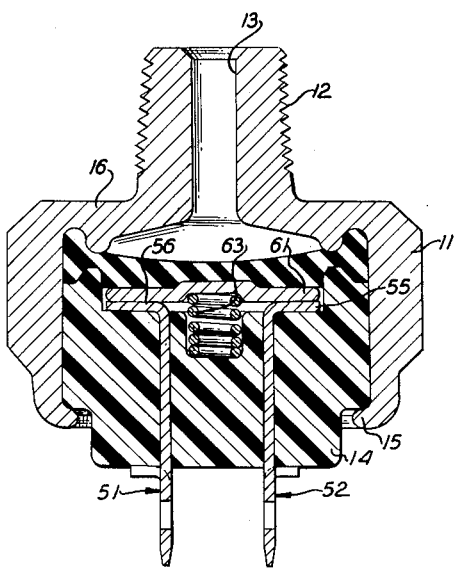
FIGURE 8 is a sectional view similar to FIGURE 7 but showing the switch in a closed position.
Figure 9:
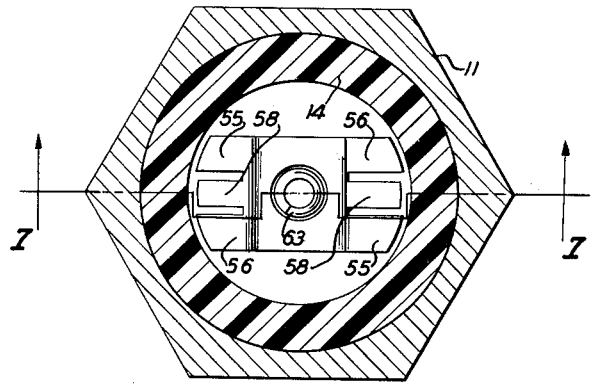
FIGURE 9 is a cross-sectional view taken along the lines 9—9 of FIGURE 7.
Figure 10:
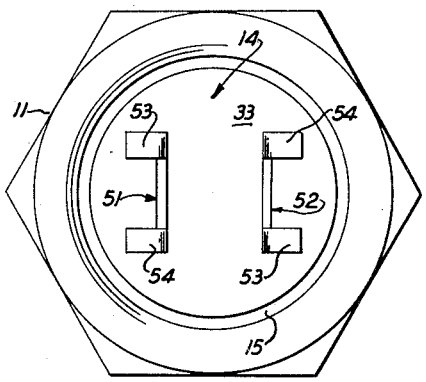
FIGURE 10 is a bottom plan view of the embodiment shown in FIGURES 7 and 8.

The stop member 14 has a cavity 23 positioned therein which forms a chamber 29 with the diaphragm 22. Two terminals generally designated by the numerals 24 and 25 extend through the end wall 26 of the stop member and are provided with a main body portion 27 which has an aperture 28 for connection to an external circuit, for example, the stop lights in an automotive vehicle. These terminals are held in position by two tongues 31 and 32 which extend at approximately right angles to the main body portion and engage the outer surface 33 of the end wall 26 and are provided with another pair of tongues 34 and 35 which also extend at approximately right angles to the main body portion and engage the inner surface 36 of the end wall 26. The tongues 31 and 32 are shown in FIGURE 6 in a position prior to their being bent at right angles to the main body portion 27 into engagement with the outer surface 33 of the wall 26. Each of the terminals is also provided with a flexible end portion 37 which includes a central S-shaped structure 38 that joins the main body portion 27.

A conductive contact member or bridge 41 which has a surface extending at an acute angle to the diaphragm 22 is positioned within the chamber 29 and is urged against the diaphragm by means of a helical spring 42 which is positioned in a bore 43 in the contact member and in a bore 44 in the end wall 26 of stop member 14. The surface of the contact member 41 is preferably of conical configuration, and the end portions 37 of the terminals 24 and 25 are preferably formed with complementary conical surfaces.

Figure 3:
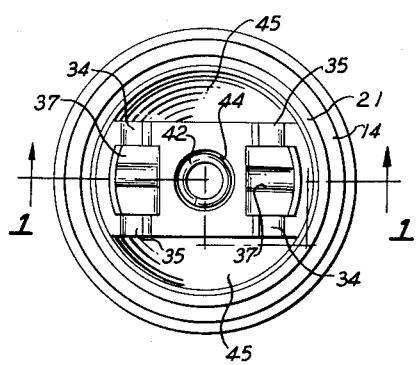
FIGURE 3 is a view taken along the lines 3—3 of FIGURE 1 but omitting the flexible diaphragm.
Figure 4:
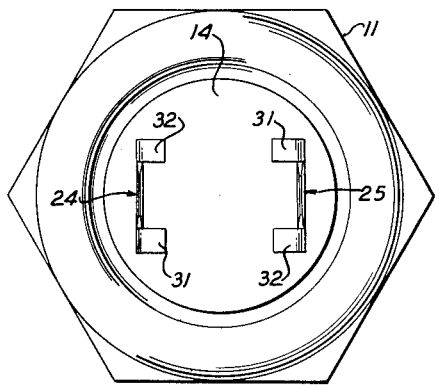
FIGURE 4 is a bottom plan view of the embodiment shown in FIGURES 1 thru 3.
Figure 5:
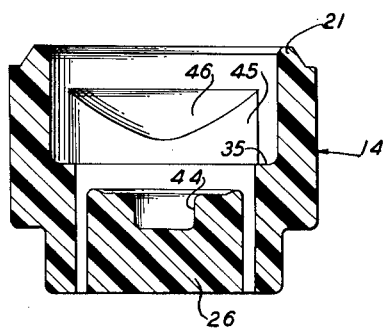
FIGURE 5 is a longitudinal sectional view of the stop member shown in FIGURES 1 thru 4.

As can best be seen by reference to FIGURES 3 and 5, the stop member 14 is provided with a pair of projections, which are designated by the numeral 45. Each projection extends from the inner surface 35 of the end wall 26 toward the flexible diaphragm 22 and has a conical surface 46 which is complementary to the conical surface of the contact member 41. These two surfaces are positioned on opposite sides of the stop member 14, as can best be seen by reference to FIGURE 3, and the terminals 24 and 25 are positioned between these surfaces and at approximately ninety degrees therefrom. When the switch is in the open position, the conical surfaces of the end portions 37 of the terminals 24 and 25 extend above the conical surfaces 46 of the projections 45, as shown in FIGURE 1. The conical surfaces 46 serve as a stop means for the contact member 41 as the fluid under pressure acts upon the flexible diaphragm 22 to move the contact member 41 into contact with the flexible end portions of the terminals 24 and 25. As the contact member moves toward the flexible end portions 37 it comes into contact with these portions and a wiping action occurs between the metal of the contact member 41 and the flexible end portions of the terminals. These flexible end portions are bent downwardly and outwardly from the center of the switch and come to rest when the contact member engages the surfaces designated by the numeral 46.

It is thus apparent that a wiping action occurs between the material of the contact member and the flexible end portions of the terminal which reduces the voltage drop across this contact to a minimum. In order to provide a most efficient contact surface, the flexible end portions 37 and the contact member 41 of the terminals may be silver plated.

Figure 11:
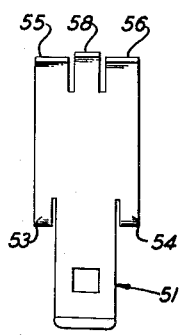
FIGURE 11 is a side elevational view of one of the terminals employed with the embodiment of the invention shown in FIGURES 7 thru 10.

FIGURES 7 thru 11 show another embodiment of the invention. In this embodiment the cavity 23 in the stop member 14 is made somewhat shorter and the inner surface of the end wall 26 is substantially flat. A pair of terminals 51 and 52 extend through the end wall 26 of the stop member 14. These terminals are quite similar to the terminals 24 and 25 employed with the embodiment shown in FIGURES 1 thru 6 and are each provided with a pair of tongues 53 and 54 which engage the outer surface 33 of the end wall 26 and are also provided with a pair of tongues 55 and 56 which engage the inner substantially flat surface 57 of the end wall 26. These four tongues on each of the terminals hold the terminals firmly in position. FIGURE 11 shows tongues 53 and 54 in a position prior to being bent at right angles to the main body portion of the terminal into engagement with the outer surface 33 of the end wall 26. Intermediate the tongues 55 and 56 of each of the terminals is a tongue 58 which is raised slightly above the tongues 55 and 56 so that the under surface thereof is spaced slightly above the surface 57. A contact member preferably in the form of a disk 61 is positioned in the chamber and has a central depression 62 in the under side thereof for receiving a spring 63 which urges the stop member against the diaphragm. It will also be noted in connection with FIGURE 7 that the end wall 16 of the casing 11 is provided with a single groove 64 and a single ridge 65 for retaining the diaphragm firmly in position.

In the operation of the pressure actuated switch shown in FIGURES 7 thru 11, when the pressure of the fluid action on the diaphragm 22 reaches a selected level, the diaphragm and the contact member 61 are moved downwardly against the action of the spring 63 and the contact member first comes into contact with the raised fingers 58, thereby making electrical contact between the two terminals 51 and 52. As the diaphragm and the stop member continue to move downwardly, the fingers 58 of each of the terminals is depressed until the under edge thereof rests against the inner surface 57 of the end wall 26 and the stop member. At this time the contact member 61 is in electrical contact with all three of the fingers 55, 56 and 58 of each terminal. To provide a good electrical contact between the contact member 61 and the fingers 55, 56 and 58 of the terminals, the surfaces thereof which are in contact with one another may be silver plated. Also, as the flexible finger 58 moves downardly against the surface 57 a wiping action takes place between this finger and the contact member 61, since the end of the fingers move outwardly from the center of the switch during this action.

The terminals 24 and 25 of the embodiment shown in FIGURES 1 thru 6 and the terminals 51 and 52 of the embodiment shown in FIGURES 7 thru 11 are constructed of a resilient conductive material such as spring brass or beryllium copper, and, as previously mentioned, may be silver coated on the surface thereof.

Thus the present invention provides a rugged, dependable and inexpensive pressure actuated switch in which a wiping action occurs between the flexible ends of the terminals and the contact member which completes an electrical circuit across these terminals. This wiping action prevents damage to the contacting surfaces and in addition prevents the surfaces from becoming contaminated due to foreign deposits thereon. As is well known, if the contacting surfaces become damaged or contaminated, a highly resistant electrical barrier is formed at the surfaces resulting in a high voltage drop across the contacting surfaces. Thus the wiping action prevents surface damage and contamination and as a result permits efficient switch operation with a small voltage drop across the contacting surfaces.

It will be understood that the invention is not to be limited to the exact construction shown and described, but that various changes and modifications may be made without departing from the spirit and scope of the invention, as defined in the appended claims.

What is claimed is:

1. A pressure actuated switch comprising a hollow casing, a member fitting within said casing, a flexible diaphragm clamped between said hollow casing and said member, said member having a surface spaced from said diaphragm, a pair of terminals extending through said member, each of said terminals having a first tongue positioned against said surface and a second tongue spaced from said surface, a conductive means positioned between said diaphragm and said surface and adapted at times to contact said tongues, and means engaging said conductive means and said member for urging said conductive means against said diaphragm and out of contact with the tongues of said terminals.

2. A fluid pressure actuated switch comprising a hollow casing including an end wall, a member closing one end of said casing, a flexible diaphragm positioned between said member and the end wall of said casing, an opening in said casing for receiving a fluid under pressure to be applied to one side of said diaphragm, said member having a surface spaced from the other side of said diaphragm, a pair of terminals each having a main body portion extending through said member, each of said terminals having a first tongue positioned against said surface and a second tongue spaced from said surface, a bridge of conductive material of sufficient diameter to make contact with the tongues of each of said terminals, spring means engaging said bridge and said member for urging said bridge against the other side of said diaphragm and out of contact with the tongues of said terminals.

3. A fluid pressure actuated switch comprising a hollow casing, a member fitting within said casing, said casing having an opening at one end thereof adapted to be connected to a source of fluid under pressure, a flexible diaphragm positioned between said casing and said member and providing a seal between said opening and said member, said member having a surface spaced from said diaphragm, a pair of terminals constructed of resilient conductive material and extending through said member, each of said terminals having a first tongue positioned against said surface and a second tongue spaced from said surface, a conductive means positioned between said diaphragm and said surface, spring means engaging said conductive means and said member for urging said conductive means against said diaphragm, said conductive means engaging the first tongue of each of said terminals and then the second tongue of each of said terminals when said diaphragm is actuated by the fluid under pressure.

(References on following page)

References Cited in the file of this patent

UNITED STATES PATENTS

| | | |
|---|---|---|
| 1,670,189 | Christie | May 15, 1928 |
| 1,732,295 | Aichele | Oct. 22, 1929 |
| 1,918,880 | White | July 18, 1933 |
| 1,957,106 | Kerzak | May 1, 1934 |
| 2,143,104 | Critchfield et al. | Jan. 10, 1939 |
| 2,260,636 | Neff | Oct. 28, 1941 |
| 2,648,733 | Billings | Aug. 11, 1953 |
| 2,794,879 | Clason | June 4, 1957 |
| 2,813,945 | Courtot | Nov. 19, 1957 |

FOREIGN PATENTS

| | | |
|---|---|---|
| 1,120,862 | France | Apr. 23, 1956 |